UNITED STATES PATENT OFFICE.

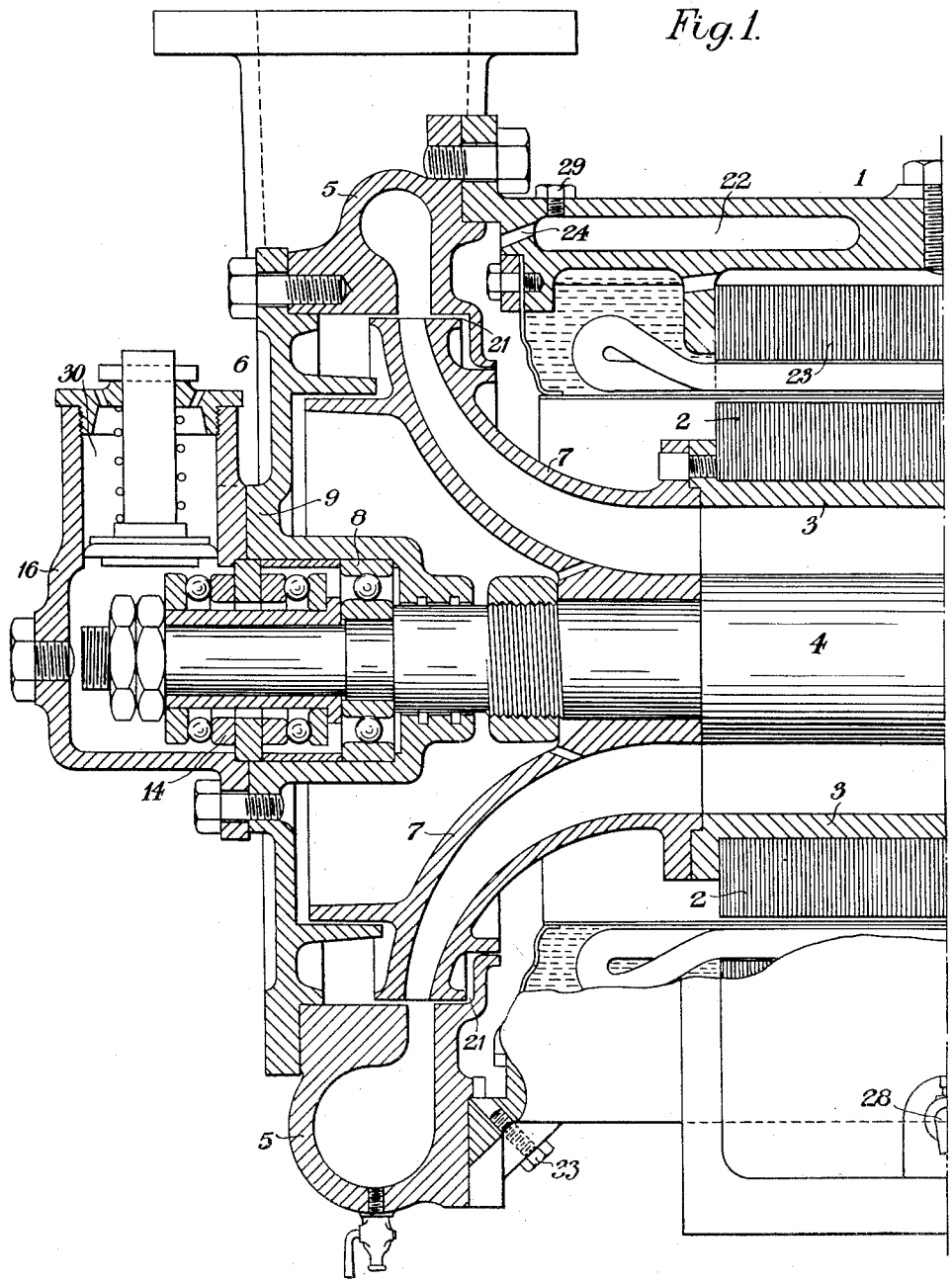

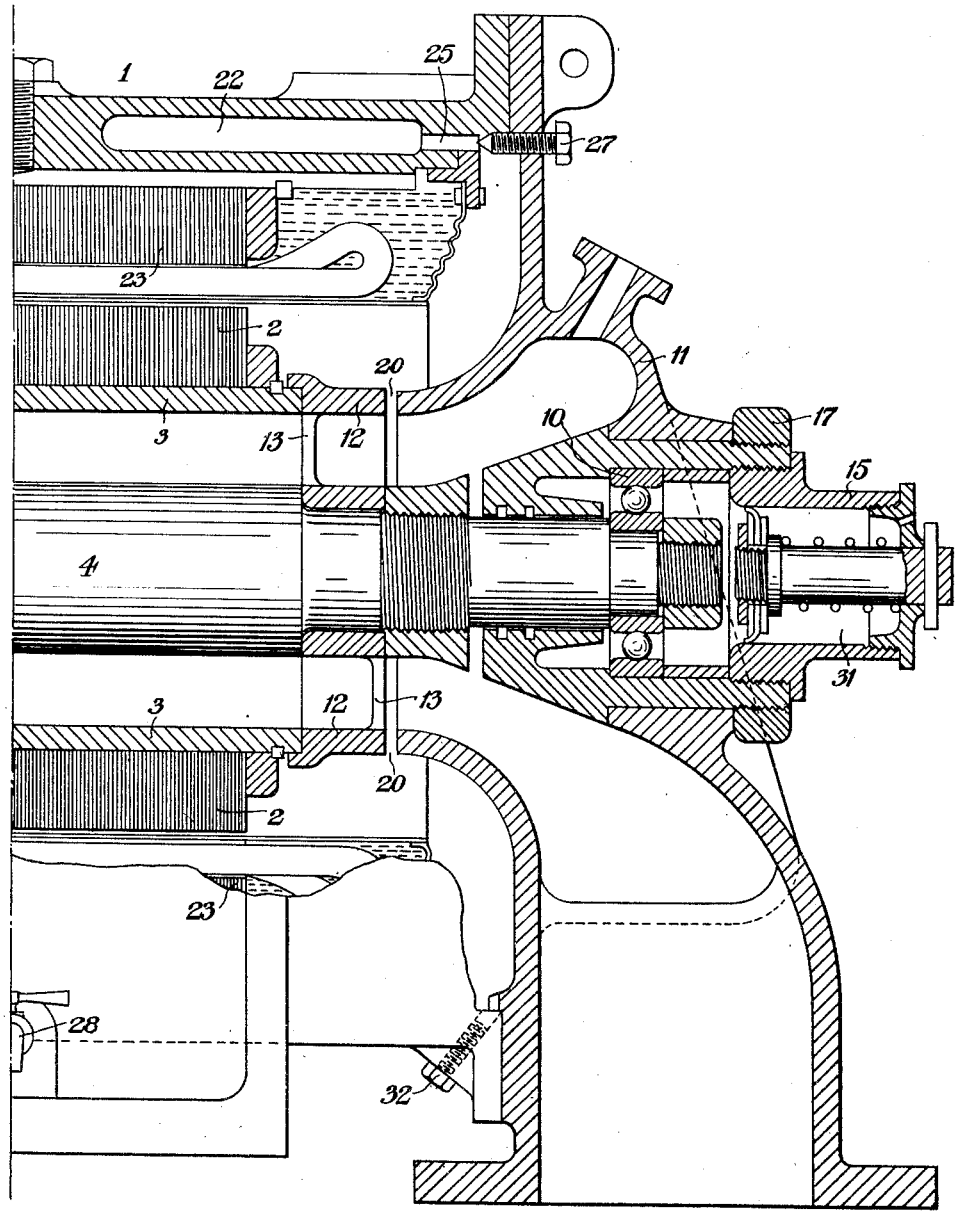

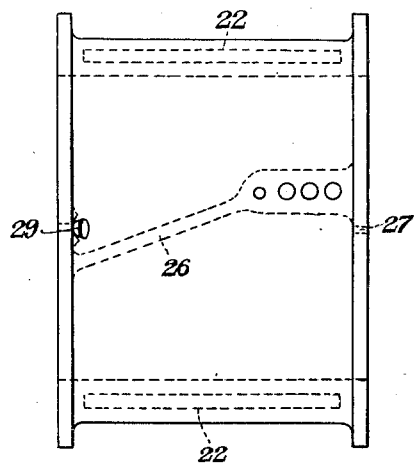

THOMAS LANCELOT REED COOPER, OF LONDON, ENGLAND.

COMBINED MOTOR-PUMP.

1,347,732.  Specification of Letters Patent.  Patented July 27, 1920.

Application filed March 25, 1919. Serial No. 284,943.

*To all whom it may concern:*

Be it known that I, THOMAS LANCELOT REED COOPER, of London, England, have invented certain new and useful Improvements in Combined Motor-Pumps, of which the following is a specification.

This invention relates to improvements in combined motor pumps.

The object of the invention is to provide an improved combination of electric motor and pump of the kind designed more particularly for use under water or in situations where an ordinary electric motor would be liable to be exposed to water or damp or to a deleterious atmosphere, the arrangement of motor and pump being such that the water is drawn through the rotary member of the motor to the impeller or like rotary member of the pump.

According to this invention I provide a combined electric motor and pump of the kind referred to in which the intake of the pump is arranged on the farther end of the motor so that the water or other liquid acted upon by the pump is drawn through the rotary member of the motor in one direction as opposed to the type in which the pump is central and the water drawn through rotors at each side of it.

A further improvement comprised in this invention consists in combining with the pump an electric motor of the kind wherein the stator windings are inclosed by means of a preferably metallic inclosure filled with insulating material such as is described in my prior British patent specifications Nos. 113,637 and 117,296. The invention also comprises other details of construction as will be observed from the following description.

In order that the invention may be clearly understood a preferred construction embodying the same will now be described with reference to the accompanying drawings, in which Figure 1 and Fig. 1ª show a sectional longitudinal view of a combined motor and pump arranged according to this invention, and Fig. 2 is a plan view of the electric motor alone, that is as seen when the fixed end parts of the combination are removed.

Referring to the drawings, the motor portion preferably consists of an electric motor 1 of the kind described in my above mentioned prior patents having its stator windings totally inclosed in a chamber containing oil, or other insulating fluid, the laminations of the rotor 2 being mounted on a sleeve or spider 3 adapted to provide a passage for the intake water through the interior of the said laminations, the said sleeve being rigidly connected to or formed integral with and surrounding the shaft 4 of the combination. The scope of the invention, however, is not limited to that particular type of motor.

The outer casing 5 forming the volute of the centrifugal pump 6 also forms the end cover of the motor at the pump end of the same. The impeller 7 is mounted upon the shaft 4 which also carries the rotor 2 of the electric motor 1, the left hand bearing 8, as seen in the drawing, being carried by the outer portion 9 of the pump casing. The bearing 10 at the other end of the shaft is carried by a second end cover 11 which also forms the intake or suction pipe for the pump, the water thus having a free passage through this end cover and through the sleeve or spider of the rotor 2 to the impeller 7 of the pump.

The end cover 11 constituting the intake of the pump is preferably so formed as to leave a running clearance 20 between the fixed portion 11 of the intake and the end portion 12 of the sleeve or spider 3 fixed to and rotating with the shaft 4. At each end of the shaft of the combination ball or roller bearings are preferably employed and a double thrust bearing 14 is fitted at one end as shown or at both ends, if desired, all bearings being accessible from the exterior of the combination by the removal of the cap 15 at the right hand end or the cap or cover 16 at the left hand end. The left hand bearing 8 and its housing at the pump end of the shaft 4 may be carried, as mentioned above, by the pump end cover 9 which for this purpose is arranged to be of such a diameter that when removed the impeller 7 may be bodily withdrawn together with the said bearings 8, 10 and 14 and their housings by the removal of a fixing nut 17 and the outside of the end cover. By this construction the whole of the revolving portion of the combination can be withdrawn together with the bearings and their housings, the ball or roller bearings and the like remaining completely sealed in their housings.

The sleeve or spider 3 referred to above upon which the rotor laminations 2 are mounted may be supported at the pump end upon a flange forming the initial part of the pump impeller 7 and at the suction end either by means of a central screw carried by the shaft 4 with a suitably dimensioned diameter and pitch, or by means of a further set of pitched vanes 13 forming a propeller or the like serving to give an initial circulating impulse to the water and so reducing the shock when the water meets the impeller blades.

From the above description it will be noted that a running clearance 20 is provided forming practically an opening into the suction side of the pump and that the leakage water escaping into the motor casing through the running clearance 21 around the impeller is returned through the said clearance, 20, to the suction side of the pump. This leakage water serves to cool the stator oil chamber and the rotor of the motor. In some cases a water jacket 22 may be fitted surrounding the stator 23 of the electric motor 1, water being admitted to the jacket 22 through a small passage 24 from the motor chamber at the pump end and entering at the top on the side next the pump and flowing around the motor jacket, the said water escaping again at the top on the other side through a passage 25 into the rotor chamber at the suction end and being guided in its course by a diagonal division 26 (Fig. 2) across the top of the water jacket 22. This water also is finally sucked back through the clearance space 20 into the pump together with the other leakage water from the impeller, the flow of water through the jacket as described above being assisted by the fact that the pressure in the pump end of the chamber is greater than at the suction end.

In order to control the water flowing around the jacket on the motor casing, as described above, a screw plug or needle valve 27 is arranged at the place where the water leaves or where it enters the jacket of the motor 1. The circulating or cooling water jacket forms a settling chamber for any dirt or sediment contained in the water which can be blown out through a blow off or sludge cock at the base of the motor or lower side of the chamber, as shown at 28, as well as by removing plugs 32 and 33. By this arrangement dirt is abstracted from the water in all three chambers. The inlet passage to the said chamber from the pump volute is so arranged that by removing a plug, or plugs 27 and 29, a wire or cleaner can be easily passed through to clear any obstruction.

It will be noted from the above description that every portion of the pump and motor can be examined and the complete rotary portion removed without breaking the joints of the suction and delivery pipes attached to the pump and the motor casing. The portion of the suction pipe located in the end bracket may be cast with the bracket in the form of a bend preferably at an angle of 45° to 90° with the shaft and so that the intake is below, above, or to one side of, the bearing.

The motor may be of any type, other than that described above, designed to work under water; it may for example be of the kind in which rubber covered cables are employed to form the stator windings, such as is described in my British patent application No. 19384 A. D. 1908, or any other type in which a central water passage can be arranged through the rotating member of the machine.

In the arrangement illustrated the bearings are provided with lubricators 30, 31, of a special kind adapted for working when submerged and so constructed that the grease or the like contained therein is maintained at a greater pressure than the surrounding medium, so that, although grease may escape around the rotating shaft, water or the surrounding medium will not enter. For this purpose the lubricating chamber is fitted with a plunger or piston having leather hat rings and the tail or rod of this plunger is fitted with a coil or helical spring tending to force in the plunger.

When the lubricator is full of grease the spring is compressed and as water or other surrounding medium can enter behind the piston it will tend to assist the spring in pressing in the plunger and thus will prevent the water or other surrounding medium which may be under high pressure from entering the bearing by the clearance around the rotating shaft, as will be evident from Fig. 1 of the drawings. It will also be evident that these lubricators will operate equally effectively when not submerged in liquid.

By the combined construction described above it is possible to reduce the overall size and weight and to increase the efficiency as compared with existing combinations of this kind and the accessibility is considerably improved, while the combination is suitable for working either above at, or submerged below, the water level.

What I claim and desire to secure by Letters Patent is:—

1. In a combined electric motor and pump, a shaft, a pump impeller mounted on the shaft, a fixed pump volute, a hollow spider mounted on the shaft, and rotor plates mounted on the spider of such diameter that they can be withdrawn together with the shaft through the pump volute.

2. In a combined electric motor and pump, a shaft, a pump impeller mounted on the shaft, a hollow rotor forming part of the inlet pipe to the impeller, a bearing at the impeller end of the shaft, a pump volute, a cover attached to the pump volute supporting the said bearing, and a bearing at the farther end of the shaft contained in a housing and adapted to be withdrawn together with its housing and the shaft, rotor and impeller through the pump volute.

3. In a combined electric motor and pump a shaft, a pump impeller mounted on the shaft, a hollow rotor mounted on the shaft, a bearing carrying the shaft adjacent to the impeller, a fixed inlet pipe at the farther end of the rotor, a housing supported in the intake pipe, a bearing supporting the shaft within the housing, and means for permitting the bearing and housing to be withdrawn from the intake pipe in the direction of the impeller.

4. In a combination electric motor and pump, a fixed inlet pipe at one end of the combination, a rotating spider adapted to receive liquid from the inlet pipe, a running clearance being left between the spider and the inlet pipe, a pump impeller adapted to draw liquid from the inlet pipe through the spider, a shaft carrying the spider and the impeller, and a volute member leaving a clearance around the impeller through which a portion of the liquid is adapted to return and enter the spider through the aforesaid running clearance.

In witness whereof I have hereunto signed my name.

THOMAS LANCELOT REED COOPER.